United States Patent Office 3,095,452
Patented June 25, 1963

3,095,452
MANUFACTURE OF CROTONALDEHYDE
James L. Callahan, Bedford, and Robert W. Foreman, Chagrin Falls, Ohio, assignors to The Standard Oil Company, Cleveland, Ohio, a corporation of Ohio
No Drawing. Filed Jan. 26, 1960, Ser. No. 4,611
3 Claims. (Cl. 260—604)

The present invention relates to a process for the manufacture of crotonaldehyde from ethylene.

Crotonaldehyde may be converted by catalytic oxidation to maleic acid and maleic anhydride. One known method of preparing crotonaldehyde utilizes acetaldehyde as a starting material. In this method acetaldehyde is subjected to an aldol condensation and the product of this reaction is dehydrated to crotonaldehyde. In contrast to this method we have now discovered that it is possible to prepare crotonaldehyde directly from ethylene.

In brief, the process of our invention comprises the step of contacting ethylene with a solid oxidant in the absence of added oxygen. A unique solid oxidant is employed in our process and it is copper phosphomolybdate. In addition to crotonaldehyde, a significant amount of acetaldehyde is formed in the process of this invention.

It is surprising that the process of this invention produces crotonaldehyde since ethylene is catalytically oxidized to ethylene oxide with relative ease. It is the latter reaction which forms the basis for the commercial manufacture of ethylene oxide. Nevertheless, in the absence of oxygen and in the presence of the unique oxidant of this process ethylene yields crotonaldehyde, which is an unsaturated aldehyde, rather than ethylene oxide.

The process of this invention may be carried out in either a fixed bed reactor or in a so-called fluidized reactor. However, in either case it will be necessary to preiodically regenerate the oxidant so as to replenish the supply of oxygen contained therein, and such a regeneration step is included in the process of this invention. The regeneration may be carried out in situ; or, in the case of a fluidized system, the oxidant may be continually circulated between the reaction zone and a separate regeneration zone.

The process is generally operated at temperatures in the range of about 600° F. to about 100° F. with a preferred temperature range of 700° F. to 900° F. We have also found that water seems to have a tendency to promote the desired reaction; and, although reactions conducted in the absence of added water are not to be excluded from our invention, we prefer to include water along with the ethylene in the feed to the reaction zone. A molal ratio of water to ethylene in the range of about 3:1 to about 5:1 seems to give the best results.

The process may be operated with relatively short contact times on the order of 1 to 15 seconds, but longer contact times may be employed if desired up to about 50 seconds. Beyond 50 seconds, there is hardly any further reaction.

As explained before, the unique oxidant employed in our process is copper phosphomolybdate. It is preferably mounted on a high surface area support such as silica. There is nothing critical in the method of preparation of this oxidant and the oxidant may be prepared in any suitable manner such as those known to those skilled in the art for preparing various catalysts. For example, the oxidant may be prepared by co-gelling the various ingredients followed by drying and screening or alternately a slurry of the co-gelled mixture may be spray dried according to the conventional techniques. Still another method of preparing the oxidant of this process is to impregnate a slurry of the co-gelled oxidant ingredients on the support.

The invention is illustrated by the examples which follow below. The same oxidant was employed in both examples and the method of preparation now follows.

583 parts of a low alkali silica sol containing 30% by weight of silica was mixed with 20.5 parts of 85% phosphoric acid, 75 parts of molybdic acid (85% $MoO_3$), and 170 parts of cupric nitrate-trihydrate. This mixture was stirred at about 125° F. The solution was then fed to a spray dryer and the dried product was collected. The product was calcined in an oven at 650° F. for 24 hours and then raised to a temperature of 1000° F. for 2 hours.

Both of the examples which follow were carried out in a conventional carbon steel reactor containing 200 g. of the oxidant described above and the results obtained in these examples are reported in the table below. In both examples the feed rate was 0.3 g. of ethylene per minute and the feed also contained 0.7 g. of water per minute.

| Example | Temp., °F. | Percent Conversion to various products | Percent Total Conversion |
|---|---|---|---|
| 1 | 750 | 1.18% crotonaldehyde<br>3.56% acetaldehyde<br>0.41% formaldehyde<br>0.31% acetic acid | 23.8 |
| 2 | 850 | 1.08% crotonaldehyde<br>2.64% acetaldehyde<br>0.35% formaldehyde<br>0.20% acetic acid | 42.7 |

Although the yields of product obtained and the conversion levels were low, this process is believed to have great significance because, so far as it is known, there is no precedent for the direct conversion of ethylene to crotonaldehyde. Furthermore, the byproducts of the process are valuable and have commercial value. All that it is necessary to do to improve the economics of the operation is to separate the products from the unreacted ethylene and recycle the ethylene to the reaction zone. In this manner we believe that we have provided a quick and economical method of producing crotonaldehyde directly from ethylene.

It will, of course, be obvious to those skilled in the art that various modifications of the procedure set forth in the above examples can be resorted to without adversely affecting the main reaction, and this application for Letters Patent is intended to cover all such modifications as would reasonably fall within the scope of the appended claims.

We claim:

1. A process for the manufacture of crotonaldehyde which comprises contacting ethylene with copper phosphomolybdate as a solid oxidant at a temperature in the range of 600° F. to 1000° F.

2. The process of claim 1 which is conducted at a temperature in the range of 700° F. to 900° F.

3. A process for the manufacture of crotonaldehyde which comprises contacting a gaseous mixture of ethylene and water with copper phosphomolybdate as a solid oxidant at a temperature in the range of 600° F. to 1000° F., said gaseous mixture having a molal ratio of water to ethylene in the range of about 3:1 to about 5:1.

References Cited in the file of this patent

UNITED STATES PATENTS 2,788,258    Arnold et al.           Apr. 9, 1957
2,941,007    Callahan et al.        June 14, 1960